United States Patent
Doherty et al.

(10) Patent No.: US 8,830,847 B1
(45) Date of Patent: Sep. 9, 2014

(54) DETERMINING PATH STABILITY USING SOURCE ROUTED PACKETS IN WIRELESS NETWORKS

(75) Inventors: Lance Robert Doherty, San Leandro, CA (US); Zhenqiang Ye, Mountain House, CA (US); Jonathan Simon, Castro Valley, CA (US)

(73) Assignee: Dust Networks, Inc., Hayward, CA (US)

( * ) Notice: Subject to any disclaimer, the term of this patent is extended or adjusted under 35 U.S.C. 154(b) by 484 days.

(21) Appl. No.: 12/770,571

(22) Filed: Apr. 29, 2010

Related U.S. Application Data

(60) Provisional application No. 61/216,601, filed on May 19, 2009.

(51) Int. Cl.
*H04L 12/28* (2006.01)
*H04W 40/12* (2009.01)

(52) U.S. Cl.
CPC .................................... *H04W 40/12* (2013.01)

USPC .......................................................... 370/252

(58) Field of Classification Search
None
See application file for complete search history.

(56) References Cited

U.S. PATENT DOCUMENTS

| | | | |
|---|---|---|---|
| 2005/0185632 A1* | 8/2005 | Draves et al. | 370/351 |
| 2007/0177518 A1* | 8/2007 | Li et al. | 370/252 |

* cited by examiner

*Primary Examiner* — John Blanton
*Assistant Examiner* — Alan Lindenbaum
(74) *Attorney, Agent, or Firm* — McDermott Will & Emery LLP

(57) ABSTRACT

A system for determining path stability using source routed packets in a wireless network comprises a processor and a memory. The processor is configured to select a source route on which to send one or more probing packets, wherein the source route includes a path between a first node and a second node and calculate a stability of the path based at least in part on a success or a failure location of each of the one or more probing packets. The memory is coupled to the processor and configured to provide instructions to the processor.

20 Claims, 8 Drawing Sheets

300

Timeslot

| Offset | 1 | 2 | 3 | 4 | 5 | 6 |
|---|---|---|---|---|---|---|
| 1 | B to D | C to B | C to E | | | E to C |
| 2 | A to C | | A to B | | D to B | B to A |
| 3 | | | D to F | B to C | | |
| 4 | | E to D | | | C to A | F to D |
| 5 | F to E | | | D to E | E to F | |

Fig. 3

DETERMINING PATH STABILITY USING SOURCE ROUTED PACKETS IN WIRELESS NETWORKS

CROSS REFERENCE TO OTHER APPLICATIONS

This application claims priority to U.S. Provisional Patent Application No. 61/216,601 entitled DETERMINING PATH STABILITY USING SOURCE ROUTED PACKETS IN WIRELESS NETWORKS filed May 19, 2009 which is incorporated herein by reference for all purposes.

BACKGROUND OF THE INVENTION

Wireless networks are composed of devices locally generating data for remote destinations. Wireless nodes typically use wireless communication (e.g., radio transmission) to send their data to a central computer system, which accumulates the data and builds it into a larger picture. In some wireless network systems, communication among nodes is organized as a set of links, scheduled in time into a communications superframe. A communications scheme organized in this way saves power by minimizing the total time each node needs to have its transmitter and receiver powered on. Each superframe can be designed for a different communication need (e.g., system startup, normal operation, node diagnostics, emergency purposes), and nodes can individually switch among superframes as necessary or nodes can have multiple superframes operating concurrently.

Data and control packets flow in wireless networks over graphs that locally route packets from node to node. Wireless nodes have finite output power and hence are limited to a certain communication range. Communication across the network from source to destination may require several retransmissions of the packet. Each transmission is called a hop, and each hop passes the packet from a sender node to a receiver node. Each unordered node pair between which it is possible to exchange packets in a network is called a path. A routing graph instructs the packet which paths are valid for the next hop of its route.

The fraction of packets transmitted by the sender that are properly received by the receiver and acknowledged on a path is called the path stability. To ensure adequate levels of performance, diagnostics are kept to quantify path stability throughout the network. The only way to certainly measure path stability is to send packets and see what fraction is acknowledged. Wireless performance on paths varies with time so it is expected that path stability changes and frequent packet sending is required to maintain an up-to-date measure of path stability.

Some paths are on high-traffic graphs which allow normal network functionality to generate enough data to measure path stability. Other paths, maybe to save power, are not used as frequently. Some paths also are used primarily for packet types that are not acknowledged and hence do not provide a mechanism for path stability measurement.

BRIEF DESCRIPTION OF THE DRAWINGS

Various embodiments of the invention are disclosed in the following detailed description and the accompanying drawings.

FIG. 3 is a diagram illustrating an embodiment of a communications superframe for a time-synchronized wireless network.

DETAILED DESCRIPTION

Figure 1:
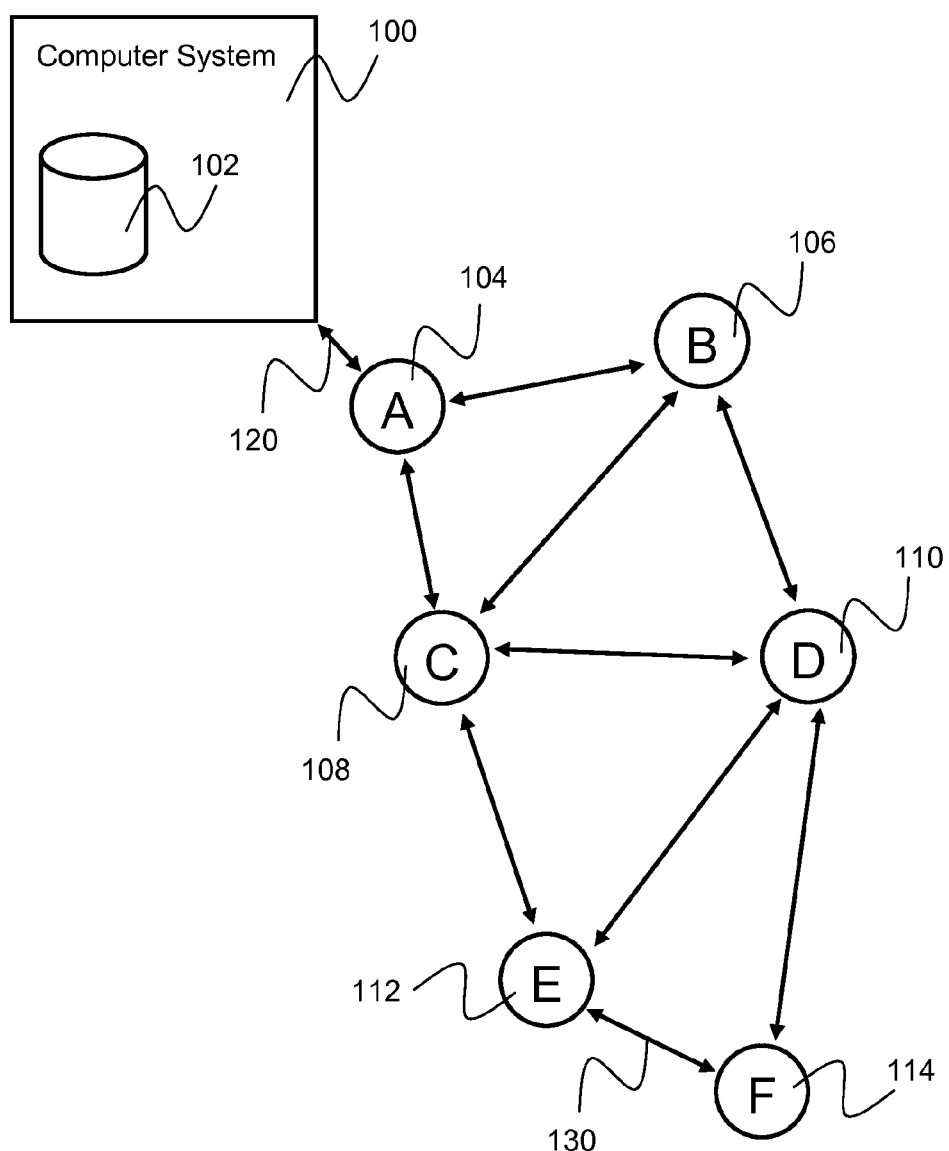
FIG. 1 is a block diagram illustrating an embodiment of a wireless network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Determining path stability using source routed packets in wireless networks is disclosed. A system for determining path stability using source routed packets in a wireless network comprises a processor and a memory. The processor is configured to select a source route on which to send one or more probing packets, wherein the source route includes a path between a first node and a second node and calculate a stability of the path based at least in part on a success or a failure location of each of the one or more probing packets. The memory is coupled to the processor and configured to provide instructions to the processor.

A data packet is routed from one node to another node using source routing, where an ordered list of nodes is transmitted with the data packet indicating the nodes through which the data packet is to be forwarded. When a node receives a source routed data packet, it determines the next node in the source route, waits for the appropriate link in the superframe, and then forwards the packet to the next node. When the data packet reaches the end of the source route, the final node transmits an acknowledgement back to the originating node, implicitly acknowledging that the packet has traversed the entire route successfully. Use of a source routed packet allows data included in the packet to be communicated to a specific subset of nodes, in a specific order. If a source routed packet cannot reach the end of the source route, a source route failure packet is sent back to the packet source instead of an acknowledgement. This failure packet allows the source to try another source route or a different mechanism for reaching the destination.

Imperfect (<100%) path stability is expected on most paths in wireless networks, and is assumed to be symmetric (e.g., packets transmitted from node A to node B have the same success rate as packets transmitted from node B to node A). Because of this symmetry, we discuss path stability as a property of a path instead of an ordered pair of nodes. Packets transmitted are expected to be unacknowledged sometimes and retry mechanisms are built into wireless network protocols. These mechanisms apply equally to graph routed and source routed packets. Packets that are not acknowledged (e.g., broadcast packets) cannot share the same retry mechanism. When acknowledgements are present, a node not receiving an acknowledgement retries on the same path for a pre-determined finite number of times. The end state of each hop along a source route is either delivery of the packet to the next specified hop or an overflow of the failure counter resulting in sending a packet back to the packet source reporting the failure, and a discard of the undelivered packet.

In some embodiments, the wireless network is controlled by a network management application (or "manager"). The manager communicates with wireless nodes through interacting with a wireless node known as an access point. In various embodiments, the device determining path stability in the network is a network manager, a node in the wireless network, or any other appropriate network component.

In various embodiments, source routing a packet is used between two peer nodes, from a regular node to an access point, from an access point to a regular node, or any other appropriate combination of nodes.

In various embodiments, a manager or a node of the wireless network maintains a set of statistics or data logs indicating the path stability for one or more paths or all paths in the network as actively probed using source routed packets. In some embodiments, the frequency of active probing depends on the time frame that environmental changes or node changes are expected to or measured to occur. In some embodiments, the frequency is adaptively changed to probe faster-changing path(s) more frequently and slower changing paths less frequently. In some embodiments, the processor of the device determining path stability is further configured to set or modify an interval for sending the one or more probing packets based at least in part on a variability in success or failure of a plurality of prior probing packets. In some embodiments, the statistics or data logs are presented or displayed to user or manager using tables and/or graphical representations for path stability.

FIG. 1 is a block diagram illustrating an embodiment of a wireless network. In the example shown, the wireless network comprises node 104, node 106, node 108, node 110, node 112, node 114, and computer system 100. Computer system 100 communicates with access point node 104 via connection 120. In various embodiments, connection 120 is a wired connection, a wireless connection, a local area network, a wide area network, the Internet, or any other appropriate network. In some embodiments, gateway node 104 is one of a plurality of access point nodes. In some embodiments, computer system 100 is capable of processing data sent to it through the wireless network. Computer system 100 includes storage 102.

In the example shown, paths exist between nodes that are linked by communication opportunities assigned in superframes. Node 104 is linked to nodes 106 and 108. Node 106 is linked to node 104, node 108, and node 110. Node 108 is linked to node 104, node 106, node 110 and node 112. Node 110 is linked to node 106, node 108, node 112, and node 114. Node 112 is linked to node 108, node 110, and node 114. Node 114 is linked to node 110 and node 112. Path 130 represents the collection of links between node 112 and node 114. In some embodiments, the nodes communicate using radio frequencies that are in the 900-930 MHz or 2.45 GHz industrial, scientific, and medical (ISM) radio band. In some embodiments, the wireless network is compatible with IEEE standard 802.15.4. The IEEE 802.15.4 standard relates to low rate wireless personal area networks. In some embodiments, the ability of nodes to link is determined by their physical distance from one another.

Figure 2:
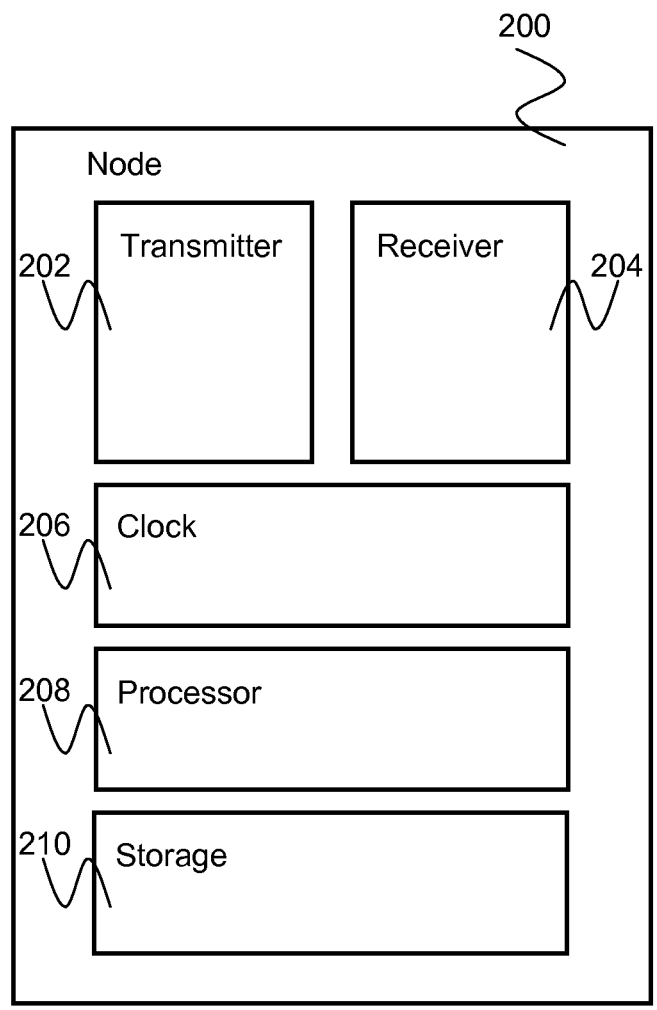
FIG. 2 is a block diagram illustrating an embodiment of a node.

FIG. 2 is a block diagram illustrating an embodiment of a node. In some embodiments, node 200 of FIG. 2 is part of a wireless network (e.g., node 104, node 106, node 108, node 110, node 112, and/or node 114 of the wireless network of FIG. 1). In the example shown, node 200 comprises transmitter 202, receiver 204, clock 206, processor 208, and storage 210. Transmitter 202 and receiver 204 enable node 200 to communicate with other nodes and/or with other systems that include transmitters and/or receivers. In various embodiments, transmitter 202 and/or receiver 204 communicate using frequency modulated signals, phase modulated signals, amplitude modulated signals, time division multiplexing signals, code division multiplexing signals, signals compliant with the Institute of Electrical and Electronics Engineers (IEEE) 802.11 standard, signals compliant with the Institute of Electrical and Electronics Engineers (IEEE) 802.15.4 standard, signals according to the Bluetooth protocol, signals according to the ultra wide bandwidth (UWB) approach, or signals encoded using any other appropriate scheme. In various embodiments, transmitter 202 and/or receiver 204 communicate in the medium frequency band, the high frequency band, the very high frequency band, the ultra high frequency band, or any other appropriate frequency band. In some embodiments, transmitter 202 and receiver 204 communicate using the industrial, scientific, and medical (ISM) bands (e.g., 902-928 MHz, 2.400-2.500 GHz, 5.725-5.875 GHz, etc.). In some embodiments, transmitter 202 and receiver 204 can switch between a low bandwidth/low power consumption mode and a high bandwidth/high power consumption mode, to enable low power use during normal operation but allow for high bandwidth transmission when necessary. In some embodiments, node 200 includes a battery and is designed to require infrequent battery replacement (e.g., a low power node that has a battery change once a month, once a few months, once a year, once every few years, etc. depending on the application). In some embodiments, node 200 includes systems designed to gather and store energy from the environment (e.g., light energy from the sun or other light energy sources, mechanical energy from vibration of the node, or any other appropriate environmental energy source).

FIG. 3 is a diagram illustrating an embodiment of a communications superframe for a time-synchronized wireless network. In some embodiments, each hop in a time-synchronized wireless network requires one or more pair-wise communication transactions between two devices. Time in a time-synchronized wireless network is broken into synchronized units called "timeslots" which are long enough for one such transaction to occur. A global "schedule" coordinates all such communication in the network enabling different multi-hop routes to be taken from source to destination depending on the neighbor assignments. Each timeslot used for communication can contain one or more "links" between sets of nodes and a repeating series of timeslots is called a "superframe". In some embodiments, a superframe comprises a plurality of sets of timeslots, corresponding to multiple links able to be activated at once on separate radio channels. Each set of timeslots is called a "channel". The position in a superframe at a timeslot in a channel is called a "cell". In some embodiments, superframe 300 comprises a communications schedule for the wireless network of FIG. 1. In the example shown, superframe 300 comprises a series of six timeslots and five channels for a total of 30 cells. A given node transmits or receives on one channel at a time, i.e. in any timeslot. Each cell may or may not be filled with one or more communication links. The set of communication links in superframe 300 allows any path in the wireless network of FIG. 1 to be activated in either direction for one timeslot over the course of the cycle. In some embodiments, a node has multiple transmitters and/or receivers enabling multiple transmissions/receptions in a given timeslot.

The set of communication links in FIG. 3 describes which node is transmitting and which node is listening on each communication channel in each timeslot. For timeslot 1 and channel 1, node B transmits to node D. For timeslot 1 and channel 2, node A transmits to node C. For timeslot 1 and channel 5, node F transmits to node E. For timeslot 2 and channel 1, node C transmits to node B. For timeslot 2 and channel 4, node E transmits to node D. For timeslot 3 and channel 1, node C transmits to node E. For timeslot 3 and channel 2, node A transmits to node B. For timeslot 3 and channel 3, node D transmits to node F. For timeslot 4 and channel 3, node B transmits to node C. For timeslot 4 and channel 5, node D transmits to node E. For timeslot 5 and channel 2, node D transmits to node B. For timeslot 5 and channel 4, node C transmits to node A. For timeslot 5 and channel 5, node E transmits to node F. For timeslot 6 and channel 1, node E transmits to node C. For timeslot 6 and channel 2, node B transmits to node A. For timeslot 6 and channel 4, node F transmits to node D. For all other cells, no nodes are transmitting or listening.

In various embodiments, each channel in a superframe corresponds to a predetermined transmission frequency, to a pseudo randomly permuted transmission frequency, to a transmission frequency changing according to a predetermined schedule, or to a frequency determined in any other appropriate way.

In some embodiments, each graph has one or more associated superframes to encode its links. In various embodiments, each edge of a graph has one link, no links, or a plurality of links assigned in one or more superframes. Edges with links represent paths that have measurable path stability. In some embodiments, the device determining path stability comprises a processor configured to select a source route on which to send one or more probing packets, wherein the source route includes a path between a first node and a second node; and calculate a stability of the path based at least in part on a success or a failure location of each of the one or more probing packets. In some embodiments, the device sending probing source routed packets applies an algorithm to the graph to select a source route. In embodiments, the source route is selected based on shortest-route criteria.

In some embodiments, a timeslot channel combination in a superframe is used to broadcast from a transmitting node to any node that can receive the broadcast. In some embodiments, for a timeslot-channel combination designated to transmit from node 'X' to be received by node 'Y' is also used to acknowledge the receipt of a message by transmitting an acknowledgement message from node 'Y' to be received by node 'X'.

Figure 4:
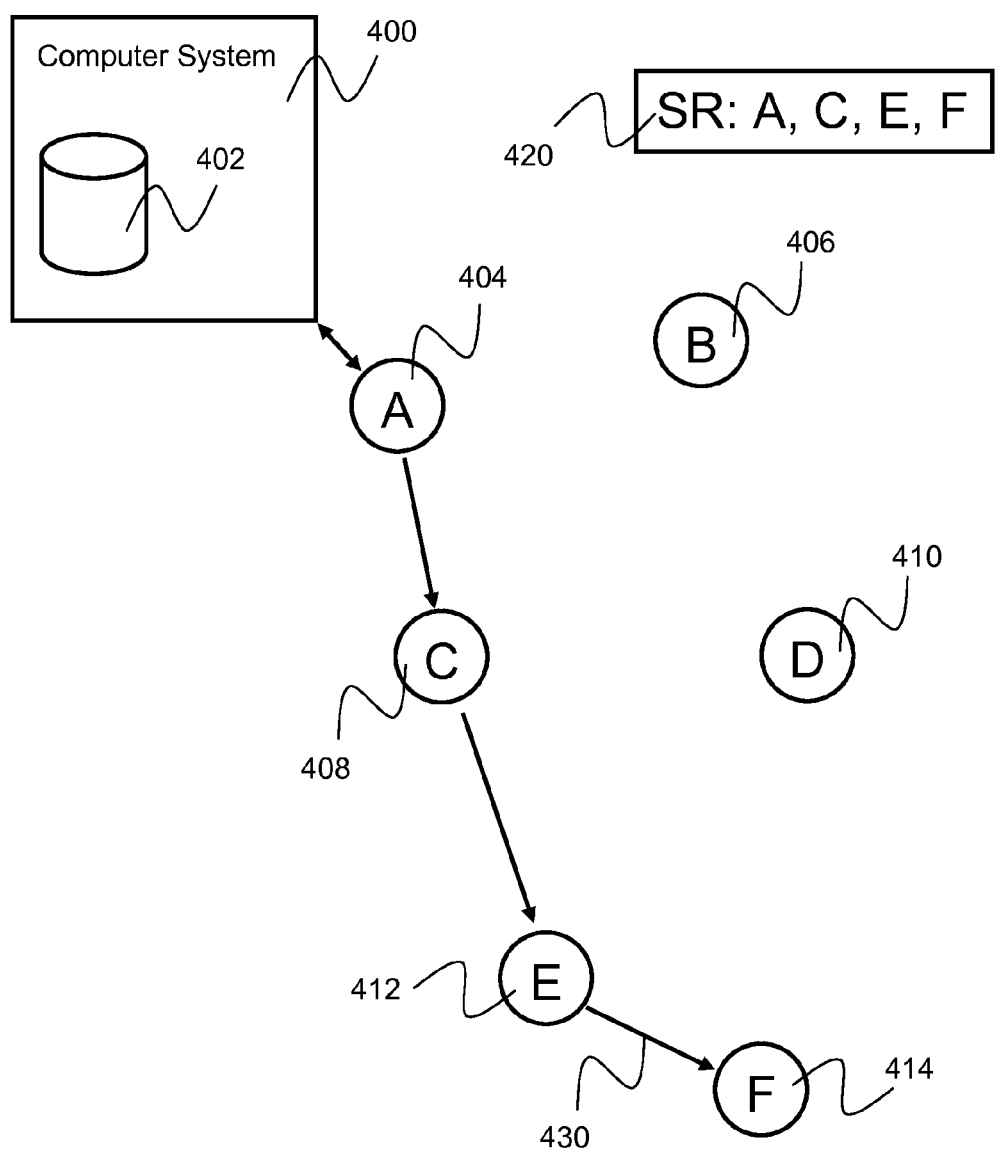
FIG. 4 is a block diagram illustrating an embodiment of a wireless network during processing of a source routed packet.

FIG. 4 is a block diagram illustrating an embodiment of a wireless network during processing of a source routed packet. In some embodiments, the wireless network of FIG. 4 comprises the wireless network of FIG. 1 during processing of a source routed packet. In some embodiments, the wireless network of FIG. 4 has communications superframe 300 of FIG. 3 activated when the source routed packet is sent. In the example shown, a source routed packet is sent from computer system 400 to node 404. The source routed packet comprises source route 420. Source route 420 is an ordered list of nodes along which the source routed packet travels. Following the source route, the source routed packet travels from computer system 400 to node 404, from node 404 to node 408, from node 408 to node 412, and from node 412 to node 414. When the source routed packet is received by a node (e.g., node 404) with an active superframe (e.g., superframe 300 of FIG. 3) in a given cell (e.g., timeslot 1, channel 2), the node extracts the source route from the packet and determines the next node in the source routed path. The node then transmits the packet to the next node in the source route on the active superframe in another cell (e.g., timeslot 3, channel 1). The cell the node transmits the packet in is the next cell in the active superframe where the node transmits to the next node in the source route. The packet containing source route 420 is transmitted from node 404 to node 408, from node 408 to node 412, and from node 412 to node 414. In some embodiments, once the node at the end of the source route (e.g., node 414) has received the source routed packet, it transmits an acknowledgement signal, which is forwarded back to computer system 400. Receipt of the acknowledgement signal by the computer system implicitly indicates that the entire source route path was completed successfully.

In some embodiments, the source route chosen by the device determining path stability is one of a plurality of source routes used to calculate the stability of the path. In some embodiments, the path chosen by the device determining path stability is one of a plurality of paths for which stability is calculated using the one or more probing packets sent on the source route. For example, computer system 400 probes the path stability of path 430 by sending a set of source routed packets with the source route 420. In some embodiments, this set of source routed packets is used to probe the path stability of the path between nodes 404 and 408; and/or between nodes 408 and 412.

Figure 5:
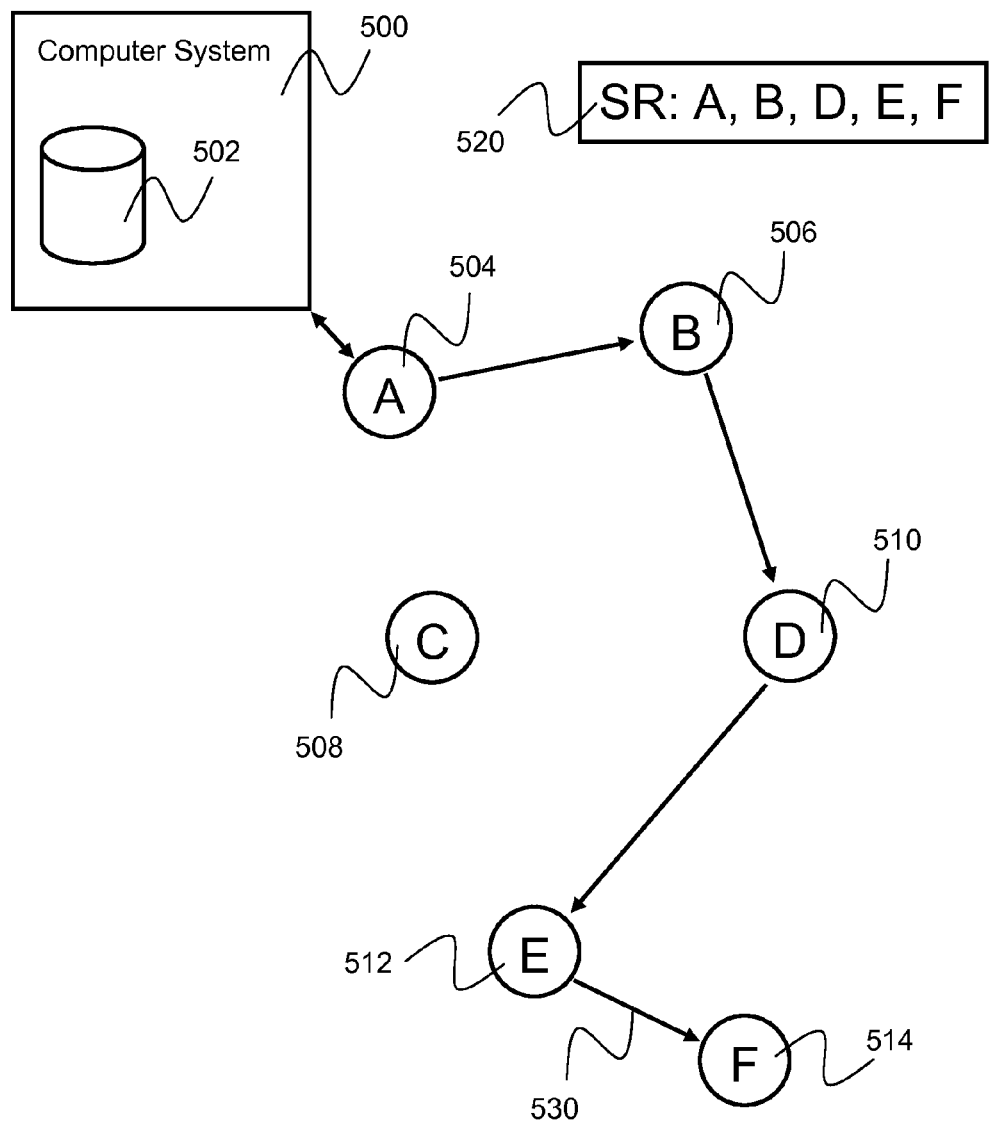
FIG. 5 is a block diagram illustrating an embodiment of a wireless network during processing of a source routed packet.

FIG. 5 is a block diagram illustrating an embodiment of a wireless network during processing of a source routed packet. In some embodiments, the wireless network of FIG. 5 is the wireless network of FIG. 1 during processing of a source routed packet. In some embodiments, the wireless network of FIG. 5 has communications superframe 300 of FIG. 3 activated when the source routed packet is sent. In the example shown, a source routed packet is sent from computer system 500 to node 504. The source routed packet comprises source route 520. Source route 520 is an ordered list of nodes along which the source routed packet travels. Following the source route, the source routed packet travels from computer system 500 to node 504, from node 504 to node 506, from node 506 to node 510, from node 510 to node 512, and from node 512 to node 514.

In some embodiments, path 530 in FIG. 5 represents the same entity as path 430 in FIG. 4. The source route 520 of FIG. 5, different from source route 420 of FIG. 4, can equally be used to probe the path stability of the path between nodes E and F. In the event of a path failure between nodes A and C, for example, the alternate source route 520 can still be used to probe the path.

Figure 6:
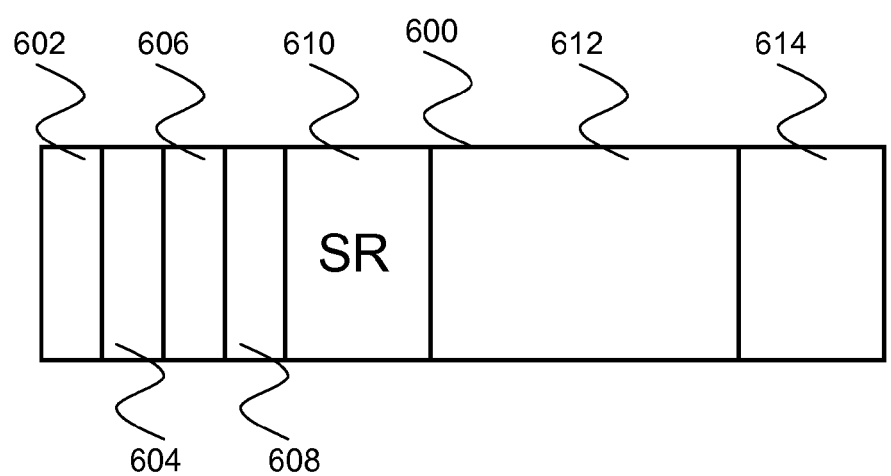
FIG. 6 is a block diagram illustrating an embodiment of a source routed packet.

FIG. 6 is a block diagram illustrating an embodiment of a source routed packet. In the example shown, source routed packet 600 includes preamble 602, start-of-frame delimiter (SFD) 604, packet length 606, source route flag 608, source route 610, payload 612, and checksum 614. Preamble 602 comprises a sequence of bits for synchronizing a clock for reading payload 612. SFD 604 comprises a sequence of bits indicating the start of the information portion of data packet 600. Packet length 606 comprises a series of bits from which the length of payload 612 can be determined. Source route flag 608 comprises a bit that is set to true if packet 600 is a source routed packet, and false if packet 600 is not a source routed packet. Since packet 600 is a source routed packet, source route flag 608 is set to true. Source route 610 comprises an ordered list of nodes that packet 600 is to traverse. Payload 612 comprises the data payload of data packet 600. In various embodiments, payload 612 includes information that is used to determine time of transmission, time of reception, turnaround time, distance or any other appropriate information. Checksum 614 is calculated using a cyclic redundancy check (CRC) operating on payload 612, and is used to determine whether payload 612 has been received without error. In some embodiments, data packet 600 is compliant with Institute of Electrical and Electronics Engineers (IEEE) 802.15.4 standard. Data packet 600 when transmitted from a radio transceiver is transmitted as information encoded in binary form as chips. In various embodiments, chips have a one-to-one correspondence with data bits; data bits are encoded into chips using a chipping sequence; data bits are first encoded into symbols, and the symbols are mapped into a chip sequence, or any other appropriate mapping between chips and data bits.

In various embodiments, a timestamp corresponds to a time associated with a start of a start-of-frame delimiter, an end of a start-of-frame delimiter, a center of a start-of-frame delimiter, a start of a preamble, an end of a preamble, a center of a preamble, a start of a packet length field, an end of a packet length field, a center of a packet length field, a start of a checksum, an end of a checksum, a center of a checksum, a start of a payload byte, an end of a payload byte, a center of a payload byte, a start of a payload bit, an end of a payload bit, or a center of a payload bit, or any other appropriate received data bit, byte, chip, or any other appropriate portion of a packet.

Figure 7:
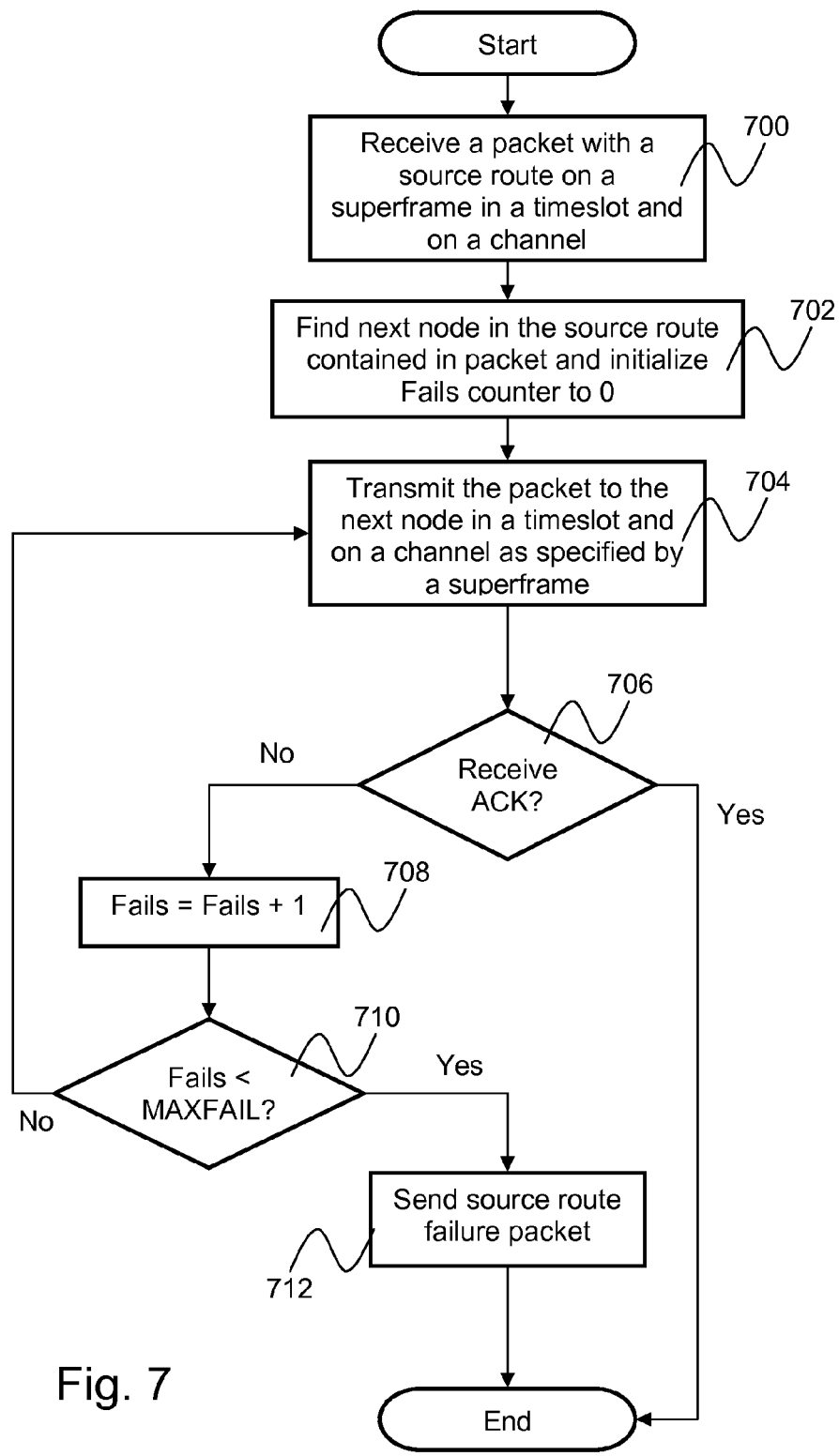
FIG. 7 is a flow diagram illustrating an embodiment of a process for processing a source routed packet.

FIG. 7 is a flow diagram illustrating an embodiment of a process for processing a source routed packet. In some embodiments, the process of FIG. 7 is used by a node (e.g. node 200 of FIG. 2) for processing a source routed packet (e.g. packet 600 of FIG. 6) in a wireless network (e.g., the wireless network of FIG. 1). In the example shown, in 700, a packet with a source route is received on a superframe in a timeslot and on a channel. In some embodiments, the superframe comprises superframe 300 of FIG. 3. In 702, the next node in the source route contained in the packet is determined, and initializes the "Fails" counter to zero. In some embodiments, the source route is not specified in the source routed packet (e.g., is specified by another packet or by another appropriate manner). In some embodiments, the source route is specified using an ordered list of nodes. In some embodiments, determining the next node in the source route comprises traversing the ordered list of nodes in the source route (e.g., source route 610 of FIG. 6) until the current node is found and then determining that the next node in the source route comprises the next node in the ordered list of nodes. In some embodiments, if the name of the current node is not found in the source route, the packet is discarded and the process ends. In 704, the source routed packet is transmitted to the next node in a timeslot and on a channel as specified by a superframe. In 706, it is determined if an ACK has been received. For example, a node checks to see if an acknowledgement (e.g., an ACK packet) is received from the next node. In the event that an ACK packet has been received, the process ends. The receipt of the ACK packet indicates that the packet has been successfully transferred. In the event that an ACK packet has not been received, the "Fails" counter is incremented by one in 708. In 710, it is determined whether the "Fails" counter is less than MAXFAIL. For example, the "Fails" counter is compared to a pre-determined maximum number of retries, "MAXFAIL". In the event that the "Fails" counter is less than MAXFAILS, in 712 a source route failure packet is sent, and the process ends. In the event that the "Fails" counter is not less than MAXFAILS, control passes to 704.

In various embodiments, MAXFAIL comprises a quantity distributed to the entire network by the manager, adaptively calculated by each individual node, specified within the source routed packet, or any other appropriate value determined in any appropriate manner.

Figure 8:
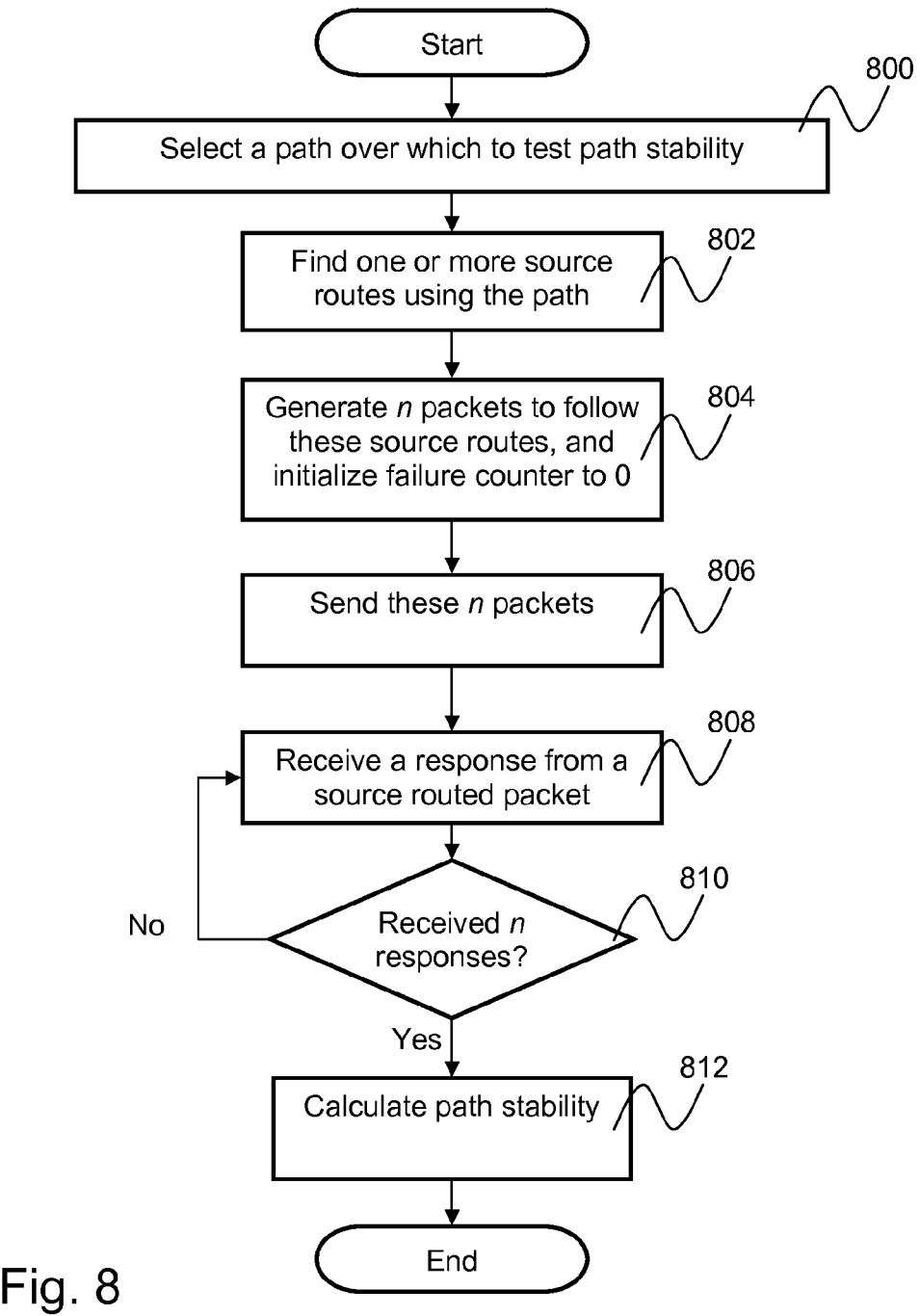
FIG. 8 is a flow diagram illustrating an embodiment of a process for using source routed packets to probe path stability.

FIG. 8 is a flow diagram illustrating an embodiment of a process for using source routed packets to probe path stability. In some embodiments, this process runs on a device as a means of calculating the path stability on a particular path in the network. In the example shown, in 800 a path is selected over which to test path stability. In 802, one or more source routes containing this path are found. In some embodiments, the source routes are found using the connectivity information (e.g., superframe information). In 804, a number n of packets (e.g. source routed packet 600 in FIG. 6) is generated to follow the one or more source routes, and the failure counter is initialized to zero. In 806, the n packets are sent. In 808, a response from a source routed packet is received. For example, the response is either an acknowledgement from the end node of the source route or a failure message from an intermediate node. In 810, it is determined whether n responses have been received. For example, the received packet count is compared against the number of packets sent out. In the event that it is determined that n had been received, then path stability is calculated in 812, and the process terminates. In the event that it is determined that n had not been received, and control passes to 808.

In some embodiments, the device determining path stability runs the process in FIG. 8 and sends source routed packets into the wireless networks through an access point. In some embodiments, dedicated source routed packets used for probing path stability are generated. In some embodiments, the one or more probing packets comprise one or more regular traffic packets that are part of regular traffic in the wireless network.

In some embodiments, the number of failures reported for a path is used to calculate the path stability of that path. In some embodiments, the number of successes is implicit in the number of acknowledgements received from end nodes along source routes that used a path. For example, suppose the path 430 between node 412 and node 414 in FIG. 4 is being probed. There are 50 source route packets sent out with source route 420, of which 43 are acknowledged by end node 414, 2 are reported as failures of path 430 by node 412 and 5 are reported as failures of the path between node 404 and node 408 by node 404. In this case, 43 of 45 packets that were transmitted along path 430 were successful. The 5 packets which failed on an earlier path are not counted.

In some embodiments, the particular value of MAXFAIL for the transmitting node of a path is used to calculate the path stability. For example, if MAXFAIL=5 in FIG. 7, the node will retry the transmission 5 times before reporting a failure back to the packet source. In some embodiments, calculating the stability of the path uses Bernouilli statistics to determine the stability of the path based at least in part on a number of failures for the one or more probing packets being sent along the source route to reach an end of the source route and on a number of total attempts. In this example for the path stability 430 of interest, 2 of 45 packets failed all five transmission attempts. 43 of 45 had one success before 5 failures. In some embodiments, the maximum likelihood predictor is used to calculate the path stability. In this example, the path stability S is then $1-(2/45)^{(1/5)}=0.4635$. The path stability is approximately meaning that of individual transmissions are expected to be successfully acknowledged.

In various embodiments, the packet source in FIG. 8 continues sending source routed packets through a path until it receives one source route failure for the path, or some other pre-determined number r of source route failures for the path. In some embodiments, calculating the stability of the path uses negative binomial statistics to determine the stability of the path based at least in part on a pre-determined number of failures for the one or more probing packets.

In some embodiments, the processor in the device determining path stability is further configured to make a change to network topology based on the stability of the path. In some embodiments, the processor in the device determining path stability is configured to modify local source routing information based at least in part on the stability of the path. In various embodiments, the calculated path stability is used as an input to network optimization algorithms, network bandwidth calculations, latency estimate calculations, alarm generation, or any other appropriate computation. In various embodiments, a single source route failure along a path results in the path being immediately deleted from the network, penalized in future optimization scores, indicating that an increase in transmission power is to be used for the path, avoided by the packet source for future source routes, or any other appropriate reaction. In some embodiments, the memory in the device determining path stability stores a record of a success or a failure of a prior probing packet. In some embodiments, the processor in the device determining path stability is further configured to modify a wireless link based on the success or the failure of the prior probing packet.

In some embodiments, the calculation of the stability of the path is based at least in part on a path stability data from a second origin. In some embodiments, the second origin comprises one of the following: reports from network nodes on packet success rates, packet latency distributions, or network average path stability. In some embodiments, using source routed packets for determining stability is critical on paths that are broadcast-only. These paths do not have acknowledgements so regular updates on path stability are not automatically received. Without the active probing using source routed packets, no indication of failure of these broadcast paths is available.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining path stability of a pre-determined path between two nodes of a wireless network using source routed packets comprising:
   a processor configured to:
      select first and second source routes on which to send one or more probing packets, wherein the first source route begins with an originating node, and wherein the first and second source routes are selected to each comprise a distinct ordered list of nodes and to each include the pre-determined path between a first node different from the originating node and a second node different from the originating node;
      cause a probing packet to be transmitted from the originating node for routing along the ordered list of nodes of the selected first source route;
      in response to transmitting the probing packet along the first source route, receive a packet reporting a location of a transmission failure from a node of the first source route;
      cause a probing packet to be transmitted on a periodic basis for routing along the ordered list of nodes of the selected second source route;
      in response to transmitting the probing packet along the second source route, receive at least one of a packet reporting a location of a transmission failure from a node of the second source route and an acknowledgment packet from an end node of the second source route;
      calculate the path stability of the pre-determined path between the first and second nodes based at least in part on the packet reporting a location of a transmission failure received in response to the probing packet sent along the first source route selected to include the pre-determined path and on the at least one of the packet reporting a location of a transmission failure and the acknowledgment packet received in response to the probing packet sent along the second source route selected to include the pre-determined path; and
      adjust a periodic interval for transmitting the probing packet along the second source route on the periodic basis based on the at least one of the packet reporting the location of the transmission failure and the acknowledgment packet received in response to the probing packet sent along the second source route; and
   a memory coupled to the processor and configured to provide instructions to the processor, wherein the calculated path stability is used as an input to a network optimization algorithm, and wherein a single source route failure along a path results in the path being penalized in future optimization scores.

2. A system as in claim 1, wherein the memory stores a record of a success of a prior probing packet to reach an end node of the selected first or second source route or a record of a failure of the prior probing packet to reach the end node.

3. A system as in claim 2, wherein the processor is configured to calculate the stability of the pre-determined path based at least in part on at least one report of a location of a transmission failure and on data other than the at least one report of the location of the transmission failure.

4. A system as in claim 3, wherein the data other than the at least one report of the location of the transmission failure comprises data based on one of the following:
   reports from network nodes on packet success rates, packet latency distributions, or network average path stability.

5. A system as in claim 2, wherein the processor is further configured to modify a wireless link based on the success or the failure of the prior probing packet.

6. A system as in claim 2, wherein the processor is further configured to adjust the periodic interval for transmitting the probing packet based at least in part on a variability in success or failure of a plurality of prior probing packets sent along the second source route.

7. A system as in claim 1, wherein the processor selects the first and second source routes to each include the pre-determined path between the first node and the second node based on connectivity information for the nodes of the wireless network.

8. A system as in claim 7, wherein the processor selects the first and second source routes to each include the pre-determined path between the first node and the second node based on superframe information that is indicative of a communication schedule for the wireless network identifying timeslots and channels used for communication between sets of nodes of the wireless network.

9. A system as in claim 1, wherein the pre-determined path is one of a plurality of paths for which stability is calculated using the one or more probing packets sent on the first source route.

10. A system as in claim 1, wherein the first source route is selected based on shortest-route criteria.

11. A system as in claim 1, wherein the processor comprises a processor of a node in the wireless network.

12. A system as in claim 1, wherein a plurality of probing packets are transmitted for routing along the selected first and second source routes, and the calculating the path stability of the pre-determined path uses Bernouilli statistics to determine the stability of the pre-determined path based at least in part on a number of received packets reporting transmission failures for the probing packets being sent along the first and second source routes to reach an end of the first or second source routes and on a number of total attempts.

13. A system as in claim 1, wherein a plurality of probing packets are transmitted for routing along the selected first and second source routes, and the calculating the path stability of the pre-determined path uses negative binomial statistics to determine the stability of the path based at least in part on a pre-determined number of failures for the one or more probing packets.

14. A system as in claim 1, wherein the processor is further configured to make a change to network topology based on the stability of the pre-determined path.

15. A system as in claim 1, wherein the one or more probing packets comprise one or more regular traffic packets that are part of regular traffic in the wireless network.

16. A system as in claim 1, wherein the processor is configured to modify local source routing information based at least in part on the stability of the pre-determined path.

17. The system of claim 1, wherein the first and second source routes both begin with the originating node, such that the probing packet caused to be transmitted for routing along the ordered list of nodes of the selected second source route is transmitted from the originating node.

18. A method for determining path stability of a pre-determined path between two nodes of a wireless network using source routed packets comprising:
selecting first and second source routes on which to send one or more probing packets, wherein the first source route begins with an originating node, and wherein the first and second source routes are selected to each comprise a distinct ordered list of nodes and to each include the pre-determined path between a first node different from the originating node and a second node different from the originating node;
causing a probing packet to be transmitted from the originating node for routing along the ordered list of nodes of the selected first source route;
in response to transmitting the probing packet along the first source route, receiving a packet reporting a location of a transmission failure from a node of the first source route;
causing a probing packet to be transmitted on a periodic basis for routing along the ordered list of nodes of the selected second source route;
in response to transmitting the probing packet along the second source route, receiving one of a packet reporting a location of a transmission failure from a node of the second source route and an acknowledgment packet from an end node of the second source route;
calculating the path stability of the pre-determined path between the first and second nodes based at least in part on the packet reporting a location of a transmission failure received in response to the probing packet sent along the first source route selected to include the pre-determined path and on the one of the packet reporting a location of a transmission failure and the acknowledgment packet received in response to the probing packet sent along the second source route selected to include the pre-determined path; and
adjusting a periodic interval for transmitting the probing packet along the second source route on the periodic basis based on the at least one of the packet reporting the location of the transmission failure and the acknowledgment packet received in response to the probing packet sent along the second source route, wherein the calculated path stability is used as an input to a network optimization algorithm, and wherein a single source route failure along a path results in the path being penalized in future optimization scores.

19. A computer program product for determining path stability of a pre-determined path between two nodes of a wireless network using source routed packets, the computer program product being embodied in a non-transitory computer readable storage medium and comprising computer instructions for:
selecting first and second source routes on which to send one or more probing packets, wherein the first source route begins with an originating node, and wherein the first and second source routes are selected to each comprise a distinct ordered list of nodes and to each include the pre-determined path between a first node different from the originating node and a second node different from the originating node;
causing a probing packet to be transmitted from the originating node for routing along the ordered list of nodes of the selected first source route;
in response to transmitting the probing packet along the first source route, receiving a packet reporting a location of a transmission failure from a node of the first source route;
causing a probing packet to be transmitted on a periodic basis for routing along the ordered list of nodes of the selected second source route;
in response to transmitting the probing packet along the second source route, receiving one of a packet reporting a location of a transmission failure from a node of the second source route and an acknowledgment packet from an end node of the second source route;

calculating the path stability of the pre-determined path between the first and second nodes based at least in part on the packet reporting a location of a transmission failure received in response to the probing packet sent along the first source route selected to include the pre-determined path and on the one of the packet reporting a location of a transmission failure and the acknowledgment packet received in response to the probing packet sent along the second source route selected to include the pre-determined path; and adjusting a periodic interval for transmitting the probing packet along the second source route on the periodic basis based on the at least one of the packet reporting the location of the transmission failure and the acknowledgment packet received in response to the probing packet sent along the second source route, wherein the calculated path stability is used as an input to a network optimization algorithm, and wherein a single source route failure along a path results in the path being penalized in future optimization scores.

20. A system for determining path stability of pre-determined paths between pairs of nodes of a wireless network using source routed packets comprising:

a processor configured to:

select a source route on which to send one or more probing packets, wherein the source route comprises an ordered list of nodes beginning with an originating node, and is selected to include a first pre-determined path between a first node different from the originating node and a second node different from the originating node and to include a second pre-determined path between third and fourth nodes different from the first and second nodes;

cause a probing packet to be transmitted on a periodic basis from the originating node for routing along the ordered list of nodes of the selected source route;

in response to transmitting the probing packet, receive a packet reporting a location of a transmission failure from a node of the source route;

calculate a stability of the first pre-determined path between the first and second nodes and a stability of the second pre-determined path between the third node and the fourth node based at least in part on the packet reporting a location of a transmission failure received in response to transmitting the probing packet along the source route selected to include both the first pre-determined path and the second pre-determined path; and adjust a periodic interval for transmitting the probing packet along the selected source route on the periodic basis based on the packet reporting the location of the transmission failure; and a memory coupled to the processor and configured to provide instructions to the processor, wherein a calculated path stability is used as an input to a network optimization algorithm, and wherein a single source route failure along a path results in the path being penalized in future optimization scores.

* * * * *